US008965375B2

(12) United States Patent
Michel et al.

(10) Patent No.: US 8,965,375 B2
(45) Date of Patent: Feb. 24, 2015

(54) PATHLOSS BASED ACCESS NODE WAKE-UP CONTROL

(75) Inventors: Juergen Michel, Munich (DE); Dirk Rose, Munich (DE)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 14/115,404

(22) PCT Filed: May 4, 2011

(86) PCT No.: PCT/EP2011/057133
§ 371 (c)(1),
(2), (4) Date: Nov. 4, 2013

(87) PCT Pub. No.: WO2012/149968
PCT Pub. Date: Nov. 8, 2012

(65) Prior Publication Data
US 2014/0080488 A1    Mar. 20, 2014

(51) Int. Cl.
*H04W 36/00* (2009.01)
*H04W 36/04* (2009.01)
*H04W 52/02* (2009.01)
*H04W 24/10* (2009.01)

(52) U.S. Cl.
CPC .......... *H04W 36/04* (2013.01); *H04W 52/0206* (2013.01); *H04W 52/0235* (2013.01); *H04W 24/10* (2013.01)
USPC ........... 455/436; 455/437; 455/438; 455/439; 370/331; 370/332; 370/333; 370/334

(58) Field of Classification Search
CPC .................. H04W 52/0206; H04W 52/0235; H04W 24/10; H04W 36/04
USPC ........................ 455/436–444; 370/331–334
See application file for complete search history.

(56) References Cited

U.S. PATENT DOCUMENTS

| 6,498,932 | B1 * | 12/2002 | Silventoinen et al. ......... 455/424 |
| 8,817,734 | B2 * | 8/2014 | Khoryaev et al. ............. 370/329 |
| 2013/0242812 | A1 * | 9/2013 | Khoryaev et al. ............. 370/278 |
| 2013/0242889 | A1 * | 9/2013 | Khoryaev et al. ............. 370/329 |

FOREIGN PATENT DOCUMENTS

| EP | 2 299 759 A1 | 3/2011 |
| EP | 2 312 889 A1 | 4/2011 |
| WO | WO 2010/093298 A1 | 8/2010 |
| WO | WO 2010/123417 A1 | 10/2010 |
| WO | WO 2011/042043 A1 | 4/2011 |

* cited by examiner

*Primary Examiner* — Charles Shedrick
(74) *Attorney, Agent, or Firm* — Harrington & Smith

(57) ABSTRACT

There are provided measures for a pathloss-based access node wake-up control, more specifically a pathloss-based access node wake-up control in a heterogeneous network environment. Such measures exemplarily include a retrieval of an average handover pathloss level between an access node and a neighboring access node, an estimation of an uplink sounding pathloss level between the access node and a terminal, said terminal being connectable to the access node and the neighboring access node, a comparison of the estimated uplink sounding pathloss level and the retrieved average handover pathloss level, and an enabling of a switch-on of the access node from an inactive state in which a transmitter is switched off to an active state in which the transmitter is switched on, when the estimated uplink sounding pathloss level is smaller than the retrieved average handover.

22 Claims, 9 Drawing Sheets

PATHLOSS BASED ACCESS NODE WAKE-UP CONTROL

FIELD

The present invention relates to a pathloss-based access node wake-up control. More specifically, the present invention exemplarily relates to a pathloss-based access node wake-up control in a heterogeneous network environment.

BACKGROUND

The present specification basically relates to energy/power saving in communication networks.

Low power consumption is to be considered an important performance indicator for communication networks and the users of a cellular phone. Today, the power consumption of a user equipment (UE) is typically described in terms of battery life time and, more specifically, talk time and standby time. On the network side, the power consumption is mainly described by the power consumption of access nodes (such as base stations), and is typically measured for different configuration and load assumptions. In principle the access node power consumption for zero load over the air interface could be seen then as standby time power leakage of the access system. In future, it is expected that energy related measures are playing a more and more important role in the design and configuration of a competitive future radio access network.

Therefore, and to support energy efficient radio access networks, 3GPP (Third Generation Partnership Project) has introduced higher layer procedures for base station (access node) switch-off or switch-on (wake-up). The procedures in general can be distinguished to be controlled autonomously at the base station (access node) or centrally e.g. via an OAM (Operation Administration and Maintenance) entity.

While energy/power saving is generally applicable in all kinds of communication networks, certain efforts in this regard have already been made specifically in the context of heterogeneous network environments. Accordingly, such heterogeneous network environments are taken as a non-limiting example in the remainder of the present specification.

In the development of cellular systems in general, and access networks in particular, heterogeneous network environments, also referred to as multi-layer cellular network systems, comprising a combination of macro or overlay cells and micro or underlay cells (also referred to as pico cells or femto cells) are proposed as one concept. Thereby, the macro cells (having high transmit power) typically provide for a large geographical coverage, while the micro cells (having low transmit power) typically provide for additional capacity of low geographical coverage in areas with a high user deployment. Thus, the macro cell layer is also referred to as coverage layer, and the micro cell layer is also referred to as capacity layer or capacity boosting layer. In the context of LTE or LTE-Advanced (LTE: Long Term Evolution), the macro cells are typically deployed by access nodes or base stations denoted as eNBs, while micro cells are typically deployed by access nodes or capacity transmission nodes such as home base stations denoted as HeNBs, pico base stations, relay nodes, or the like. Such heterogeneous network environment may, thus, be considered to be composed at least of two network layers, i.e. an underlay (micro cell) layer and an overlay (macro cell) layer.

A specific example of a heterogeneous network environment is a relay-enhanced cellular system. In relaying, a terminal or user equipment (UE) is not directly connected with an access node such as a radio base station (e.g. denoted as eNodeB or eNB) of a radio access network (RAN), but via a relay node (RN) which is connected to the access node. In this case, the underlay (micro cell) layer is constituted by relay (access) nodes.

The two network layers of a heterogeneous network environment, i.e. the access nodes (base stations) and/or cells of the two network layers, may be implemented by the same radio access technologies. For example, a heterogeneous network environment may be composed of an LTE-based macro cell layer and an LTE-based micro cell layer. Herein, such deployment is typically referred to as inter-eNB scenario.

The two network layers of a heterogeneous network environment, i.e. the access nodes (base stations) and/or cells of the two network layers, may also be implemented by different radio access technologies. For example, a heterogeneous network environment may be composed of a 2G/3G-based macro cell layer (2G/3G: Second/Third Generation of Mobile Communications) and a LTE-based micro cell layer. Herein, such deployment is referred to as inter-RAT (radio access technology) scenario.

Multi-layer or heterogeneous (e.g. LTE-based) networks might be deployed using co-channel deployment, dedicate carrier deployment, or a combination of those. In co-channel deployment, both the macro and micro access nodes (base stations) are using the same carrier frequency. In dedicate carrier deployment, macro and micro access nodes (base stations) are using different carrier frequencies.

In the context of heterogeneous network environments, to reduce the network power consumption in heterogeneous networks without harming the system performance in both aforementioned deployment scenarios, the above-mentioned energy/power saving procedures are specifically directed to switch off the capacity transmission/boosting nodes/cells of the micro layer, such as home base stations, pico base stations, relay nodes, or the like, and to serve the respective users by the coverage nodes/cells of the macro layer, such as base stations. This is particularly feasible during low traffic periods (e.g. at night and during off peak network times) when the macro layer alone is capable to serve all of the remaining traffic requests.

In this regard, the main problem is to determine the correct or best suited nodes/cells of the micro layer to switch on again after their switch-off, when needed. That is, when the capacity transmission/boosting nodes/cells are not active and the load increases, the serving coverage nodes/cells could not know which micro node/cell should be activated, especially when the increasing load is concentrated in one or a few hotspots of the micro layer.

Stated in other words, the main problem is to find the best candidate for activation among possible micro layer nodes/cells in order to achieve the most effective offload result.

For this problem, several approaches have already been proposed, as outlined hereinafter.

A first conceivable approach is based on pre-defined high load/low load periods for each hotspot (which are most probably derived from historical traffic statistic data). The hotspot(s) with the highest/high (historical) load is chosen to be switched on. This approach suffers from the usage of historical and static (non-dynamic) data, thus being incapable to cope with dynamical changes such as short-term fluctuations or longer-term trends.

A second conceivable approach is to switch on all hotspots at first, and to switch off again those hotspots which experience low/no load afterwards. This approach suffers from low energy efficiency, as well as large signaling overhead, and creates handover problems due to the intermediate activation of a hotspot which remains in operation only for a short time.

A third conceivable approach is to bring the inactive hotspots in a probing phase, in which downlink reference signals are transmitted, which signal ("pilot") can be measured by idle and connected UEs and shall be reported to the macro cell's eNB in order to make an appropriate decision which micro layer nodes/cells to activate. This approach suffers from the fact that this probing phase requires to power on the full TX (transmit) chain at a number of deactivated hotspots and results in greatly lowered energy efficiency. Also, this approach might be completely inhibited in the intra-frequency case due to potential interference issues.

A fourth conceivable approach is mainly based on UE positioning methods. However, this approach suffers from the low accuracy in the order of several 100 meters even in case of the proposed usage of the enhanced cell identity parameter (E-CID). Further, other more accurate positioning methods (e.g. GPS) are either not fully available or require additional efforts in terms of software and/or hardware. Another major drawback of this approach is that the pure geographical position does not provide reliable information of the coverage situation, as in real environments a cell is generally of irregular shape.

A fifth conceivable approach is to keep (or temporarily activate) the dormant hotspots in a listening mode and to observe the interference over thermal noise (IoT), wherein the IoT per hotspot is used as an indication if (or how many) active users are nearby. In a variant of this approach, a systematic error correction to mitigate the impact of pathloss adaptation of uplink power control may be additionally introduced in order to cope with a situation in which the hotspots are at different cell locations (i.e. near/far from the relevant macro layer base station). This approach has advantages of high energy efficiency (since only the RX (receive) chain needs to be kept active for short periods) and reasonable reliability. This approach suffers from disadvantages in terms of a potential activation (wake-up) of micro layer nodes, even if there are no UEs which could be served thereby, a potentially erroneous decision of activation (wake-up) of micro layer nodes due to uplink/downlink load asymmetry, and potential additional hardware requirements.

In view of the above, while the aforementioned fifth approach is considered to be most effective for energy/power saving in communication networks, especially but exclusively in heterogeneous network environments, there is still a need to further improve an access node wake-up control.

In view thereof, there is still a need to further improve an access node wake-up control so as to keep the number of active access nodes in heterogeneous deployments low in order to achieve improved and reduced network power consumption during idle periods and off peak network hours.

SUMMARY

Various exemplary embodiments of the present invention aim at addressing at least part of the above issues and/or problems and drawbacks.

Various aspects of exemplary embodiments of the present invention are set out in the appended claims.

According to an exemplary first aspect of the present invention, there is provided a method comprising retrieving an average handover pathloss level between an access node and a neighboring access node, estimating an uplink sounding pathloss level between the access node and a terminal, said terminal being connectable to the access node and the neighboring access node, comparing the estimated uplink sounding pathloss level and the retrieved average handover pathloss level, and enabling a switch-on of the access node from an inactive state in which a transmitter is switched off to an active state in which the transmitter is switched on, when the estimated uplink sounding pathloss level is smaller than the retrieved average handover.

According to further developments or modifications thereof, one or more of the following applies:
- the method further comprises deciding on a switch-on of the access node, when the switch-on is enabled, and requesting a switch-on of the access node, when the switch-on is decided,
- the estimating comprises receiving, from the access node, a report of a received power of an uplink sounding signal received from the terminal, receiving, from the terminal, an indication of transmit power of the uplink sounding signal transmitted to the access node, and estimating an uplink sounding pathloss level based on a difference between the transmit power and the received power,
- the method further comprises configuring the terminal for transmitting the uplink sounding signal, and configuring the access node for performing sounding measurement of the uplink sounding signal,
- the uplink sounding signal comprises an uplink sounding reference signal,
- the received power indicates a power in a frequency band of the neighboring access node,
- the indication of transmit power comprises a transmit power report or a transmit power headroom report.
- the retrieving comprises receiving, from the access node, a report of an average handover pathloss level of handovers from the access node to the neighboring access node, and setting the received average handover pathloss level as the retrieved average handover pathloss level,
- the retrieving comprises computing, at the neighboring access node, an average handover pathloss level of handovers from the neighboring access node to the access node, and setting the computed average handover pathloss level as the retrieved average handover pathloss level,
- the retrieving comprises receiving, from the access node, a report of an average handover pathloss level of handovers from the access node to the neighboring access node, computing, at the neighboring access node, an average handover pathloss level of handovers from the neighboring access node to the access node, and setting a value on the basis of the received average handover pathloss level and the computed average handover pathloss level as the retrieved average handover pathloss level, and/or
- the method is operable at or by the neighboring access node.

According to an exemplary second aspect of the present invention, there is provided a method comprising receiving an uplink sounding signal from a terminal at an access node, said terminal being connectable to the access node and a neighboring access node, measuring a received power of the uplink sounding signal received from the terminal at the access node, and reporting the measured received power from the access node to the neighboring access node, wherein the receiving, measuring and reporting is performed when the access node is in an inactive state in which a transmitter is switched off.

According to further developments or modifications thereof, one or more of the following applies:
- the method further comprises receiving, from the neighboring access node, a request for a switch-on of the access node from the inactive state to an active state in which the transmitter is switched on, and switching from the inactive state to the active state based on the received request, the method further comprises receiving, from the neighboring access node, a configuration for performing sounding measurement of the uplink sounding signal, and/or computing an average handover pathloss level of handovers from the access node to the neighboring access node, and reporting the computed average handover pathloss level from the access node to the neighboring access node, wherein the computing is performed when the access node is in an active state in which the transmitter is switched on, the uplink sounding signal comprises an uplink sounding reference signal, the received power indicates a power in a frequency band of the neighboring access node, and/or the method is operable at or by the access node.

According to an exemplary third aspect of the present invention, there is provided a method comprising transmitting an uplink sounding signal to an access node, and reporting, to a neighboring access node, an indication of transmit power of the uplink sounding signal transmitted to the access node.

According to further developments or modifications thereof, one or more of the following applies:

the method further comprises receiving, from the neighboring access node, a configuration for transmitting the uplink sounding signal, the uplink sounding signal comprises an uplink sounding reference signal, the indication of transmit power comprises a transmit power report or a transmit power headroom report, and/or the method is operable at or by a terminal being connectable to the access node and a neighboring access node.

According to an exemplary fourth aspect of the present invention, there is provided an apparatus comprising an interface configured to communicate with one or more other apparatuses, and a processor configured to retrieve an average handover pathloss level between an access node and a neighboring access node, estimate an uplink sounding pathloss level between the access node and a terminal, said terminal being connectable to the access node and the neighboring access node, compare the estimated uplink sounding pathloss level and the retrieved average handover pathloss level, and enable a switch-on of the access node from an inactive state in which a transmitter is switched off to an active state in which the transmitter is switched on, when the estimated uplink sounding pathloss level is smaller than the retrieved average handover.

According to further developments or modifications thereof, one or more of the following applies:

the processor is configured to decide on a switch-on of the access node, when the switch-on is enabled, and request, via the interface, a switch-on of the access node, when the switch-on is decided, the processor, for estimating, is configured to receive, from the access node via the interface, a report of a received power of an uplink sounding signal received from the terminal, receive, from the terminal via the interface, an indication of transmit power of the uplink sounding signal transmitted to the access node, and estimate an uplink sounding pathloss level based on a difference between the transmit power and the received power, the processor is further configured to configure, via the interface, the terminal for transmitting the uplink sounding signal, and configure, via the interface, the access node for performing sounding measurement of the uplink sounding signal, the uplink sounding signal comprises an uplink sounding reference signal, the received power indicates a power in a frequency band of the neighboring access node, the indication of transmit power comprises a transmit power report or a transmit power headroom report, the processor, for retrieving, is configured to receive, from the access node via the interface, a report of an average handover pathloss level of handovers from the access node to the neighboring access node, and set the received average handover pathloss level as the retrieved average handover pathloss level, the processor, for retrieving, is configured to compute, at the neighboring access node, an average handover pathloss level of handovers from the neighboring access node to the access node, and set the computed average handover pathloss level as the retrieved average handover pathloss level, the processor, for retrieving, is configured to receive, from the access node via the interface, a report of an average handover pathloss level of handovers from the access node to the neighboring access node, compute, at the neighboring access node, an average handover pathloss level of handovers from the neighboring access node to the access node, and set a value on the basis of the received average handover pathloss level and the computed average handover pathloss level as the retrieved average handover pathloss level, and/or the apparatus is operable as or at the neighboring access node.

According to an exemplary fifth aspect of the present invention, there is provided an apparatus comprising an interface configured to communicate with one or more other apparatuses, and a processor configured to receive, via the interface, an uplink sounding signal from a terminal at an access node, said terminal being connectable to the access node and a neighboring access node, measure a received power of the uplink sounding signal received from the terminal at the access node, and report the measured received power from the access node to the neighboring access node, wherein the processor is configured to perform the receiving, measuring and reporting when the access node is in an inactive state in which a transmitter is switched off.

According to further developments or modifications thereof, one or more of the following applies:

the processor is further configured to receive, from the neighboring access node via the interface, a request for a switch-on of the access node from the inactive state to an active state in which the transmitter is switched on, and switch from the inactive state to the active state based on the received request, the processor is further configured to receive, from the neighboring access node via the interface, a configuration for performing sounding measurement of the uplink sounding signal, and/or compute an average handover pathloss level of handovers from the access node to the neighboring access node, and report, via the interface, the computed average handover pathloss level from the access node to the neighboring access node, wherein the computing is performed when the access node is in an active state in which the transmitter is switched on, the uplink sounding signal comprises an uplink sounding reference signal, the received power indicates a power in a frequency band of the neighboring access node, and/or the apparatus is operable as or at the access node.

According to an exemplary sixth aspect of the present invention, there is provided an apparatus comprising an interface configured to communicate with one or more other apparatuses, and a processor configured to transmit, via the interface, an uplink sounding signal to an access node, and report, to a neighboring access node via the interface, an indication of transmit power of the uplink sounding signal transmitted to the access node.

According to further developments or modifications thereof, one or more of the following applies:

the processor is further configured to receive, from the neighboring access node via the interface, a configuration for transmitting the uplink sounding signal, the uplink sounding signal comprises an uplink sounding reference signal, the indication of transmit power comprises a transmit power report or a transmit power headroom report, and/or the apparatus is operable as or at a terminal being connectable to the access node and a neighboring access node.

According to an exemplary seventh aspect of the present invention, there is provided a computer program product including a program comprising software code portions being arranged, when run on a processor of an apparatus (such as e.g. according to the above fourth aspect and/or developments or modifications thereof), to perform the method according to the above first aspect and/or developments or modifications thereof.

According to an exemplary eighth aspect of the present invention, there is provided a computer program product including a program comprising software code portions being arranged, when run on a processor of an apparatus (such as e.g. according to the above fifth aspect and/or developments or modifications thereof), to perform the method according to the above second aspect and/or developments or modifications thereof.

According to an exemplary ninth aspect of the present invention, there is provided a computer program product including a program comprising software code portions being arranged, when run on a processor of an apparatus (such as e.g. according to the above sixth aspect and/or developments or modifications thereof), to perform the method according to the above third aspect and/or developments or modifications thereof.

According to further developments or modifications thereof, the computer program product according to any one of the seventh to ninth aspects comprises a computer-readable medium on which the software code portions are stored, and/or the program is directly loadable into a memory of the processor.

According to any one of the above aspects and/or developments or modifications thereof, one or more of the following applies:

an access node and/or a neighboring access node comprises an access node or base station in a heterogeneous network environment comprising at least a macro cell layer and a micro cell layer, an access node comprises a pico node or a relay node in a micro cell layer of a heterogeneous network environment, a neighboring access node comprises a macro node in a macro cell layer of a heterogeneous network environment, and/or an access node and/or a neighboring access node comprises an access node in accordance with an LTE or LTE-Advanced radio access system.

By way of exemplary embodiments of the present invention, there is provided a pathloss-based access node wake-up control. More specifically, by way of exemplary embodiments of the present invention, there are provided measures and mechanisms for a pathloss-based access node wake-up control in communication networks, for example a pathloss-based access node wake-up control in a heterogeneous network environment.

By way of exemplary embodiments of the present invention, there is provided a pathloss-based access node wake-up control, which is capable of keeping the number of active access nodes in heterogeneous deployments low in order to achieve improved and reduced network power consumption during idle periods and off peak network hours. More specifically, by way of exemplary embodiments of the present invention, there are provided measures and mechanisms for a pathloss-based access node wake-up control which is advantageous in terms of avoiding a potential activation (wake-up) of micro layer nodes, even if there are no UEs which could be served thereby, a potentially erroneous decision of activation (wake-up) of micro layer nodes due to uplink/downlink load asymmetry, and potential additional hardware requirements.

BRIEF DESCRIPTION OF THE DRAWINGS

In the following, the present invention will be described in greater detail by way of non-limiting examples with reference to the accompanying drawings, in which.

DETAILED DESCRIPTION OF EMBODIMENTS OF THE PRESENT INVENTION

Figure 1:
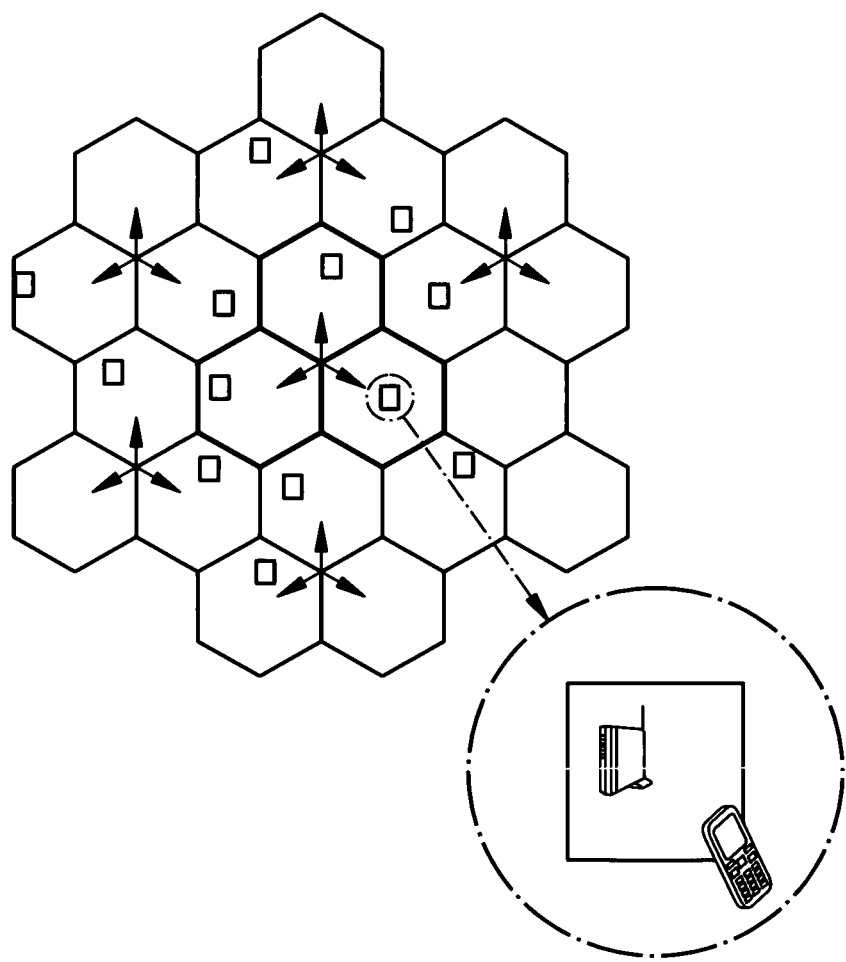
FIG. 1 shows a schematic diagram of a deployment scenario of a heterogeneous network environment, for which exemplary embodiments of the present invention are applicable.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following exemplary description mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, an LTE (E-UTRAN) radio access network and corresponding standards (LTE releases 8, 9 and LTE-Advanced release 10 and beyond) are used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Generally, embodiments of the present invention may be applicable for/in any kind of modern and future communication network including any conceivable mobile/wireless communication networks according to 3GPP (Third Generation Partnership Project) or IETF (Internet Engineering Task Force) specifications.

In particular, embodiments of the present invention may be specifically applicable in any heterogeneous network environment such as for example in any relay-enhanced (cellular) access system.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided measures and mechanisms for a pathloss-based access node wake-up control in communication networks, specifically but not exclusively in a heterogeneous network environment.

In the following, for the sake of intelligibility, LTE (Long-Term Evolution according to 3GPP terminology) or LTE-Advanced is taken as a non-limiting example for a radio access network of cellular type being applicable in the context of the present invention and its embodiments. However, it is to be noted that any kind of radio access network of cellular type, such as GSM, GPRS, HSPDA, UMTS and/or WiMAX, may likewise be applicable, as long as it exhibits comparable features and characteristics as described hereinafter.

FIG. 1 shows a schematic diagram of a deployment scenario of a heterogeneous network environment comprising a combination of macro cells and micro cells, for which exemplary embodiments of the present invention are applicable. In FIG. 1, macro cells are illustrated by hexagonal blocks, while micro cells are illustrated by rectangular blocks. In the dashed circle, an enlarged view of a micro cell including a micro cell base station and a user equipment is illustrated. The thus illustrated heterogeneous network environment may for example represent a relay-enhanced cellular system, such as e.g. a LTE or LTE-Advanced RAN with radio-relayed extensions, wherein UEs at disadvantaged positions such as a cell edge and/or high shadowing areas are connected to a macro base station which could for example be a so-called donor base station (DeNB) via a respective relay node RN.

Figure 2:
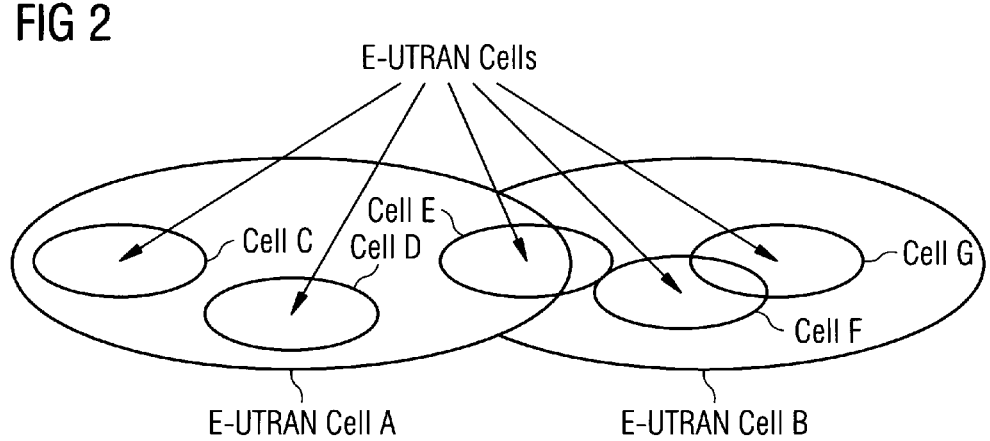
FIG. 2 shows a schematic diagram of an inter-eNB scenario of a heterogeneous network environment, for which exemplary embodiments of the present invention are applicable.

FIG. 2 shows a schematic diagram of an inter-eNB scenario of a heterogeneous network environment, for which exemplary embodiments of the present invention are applicable. The inter-eNB scenario according to FIG. 2 consists of a coverage or macro layer of E-UTRAN cells A and B) and a capacity boosting or micro layer of E-UTRAN cells C through G.

The inter-eNB scenario according to FIG. 2 is one of several ES (energy saving) scenarios defined by 3GPP, for which exemplary embodiments of the present invention are applicable. Another 3GPP-defined ES scenario, the so-called inter-RAT scenario, is similar to the illustration of FIG. 2, yet with the coverage or macro layer consisting of non-E-UTRAN cells, i.e. cells of another radio access technology, such as e.g. GERAN and/or UTRAN cells A and B.

Figure 3:
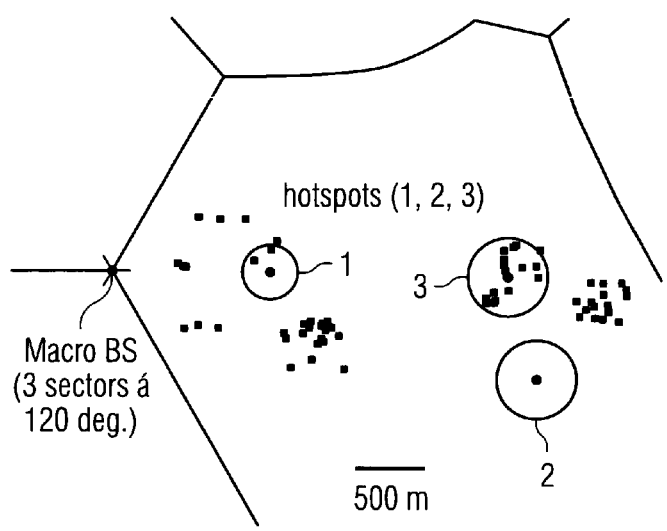
FIG. 3 shows a schematic diagram of a user distribution in a heterogeneous network environment, for which exemplary embodiments of the present invention are applicable.

FIG. 3 shows a schematic diagram of a user distribution in a heterogeneous network environment, for which exemplary embodiments of the present invention are applicable. In FIG. 3, there is illustrated an exemplary user distribution in the context of three micro cells or hotspots within a single (sector of a single) macro cell, wherein it is assumed that all of the three micro cells or hotspots are switched off and the illustrated active users (represented by dots) are served by the macro cell. When further assuming that the load is increasing and it is detected that the macro cell is (near) overload, the three micro cells or hotspots under the macro cell's coverage are potential candidates for activation in order to serve some of the UEs so as to reduce the load of the macro cell. As mentioned above, the problem is to find the best candidate for activation (hotspot 1, 2 or 3) in order to achieve the most effective offload result.

According to exemplary embodiments of the present invention, the above-mentioned fifth approach is taken as a basis. That is, for exemplary embodiments of the present invention and the subsequent description, the basic underlying concept is to keep (or temporarily activate) the dormant micro cells or hotspots in a listening mode and to observe a received signal power/strength, wherein the received signal power/strength per micro cell or hotspot is used as a basis for a wake-up decision.

Various exemplary embodiments of the present invention are directed to address the IoT-based approach's disadvantages in terms of a potential activation (wake-up) of micro layer nodes, even if there are no UEs which could be served thereby. This issue may also be considered as a reliability problem.

Figure 4:
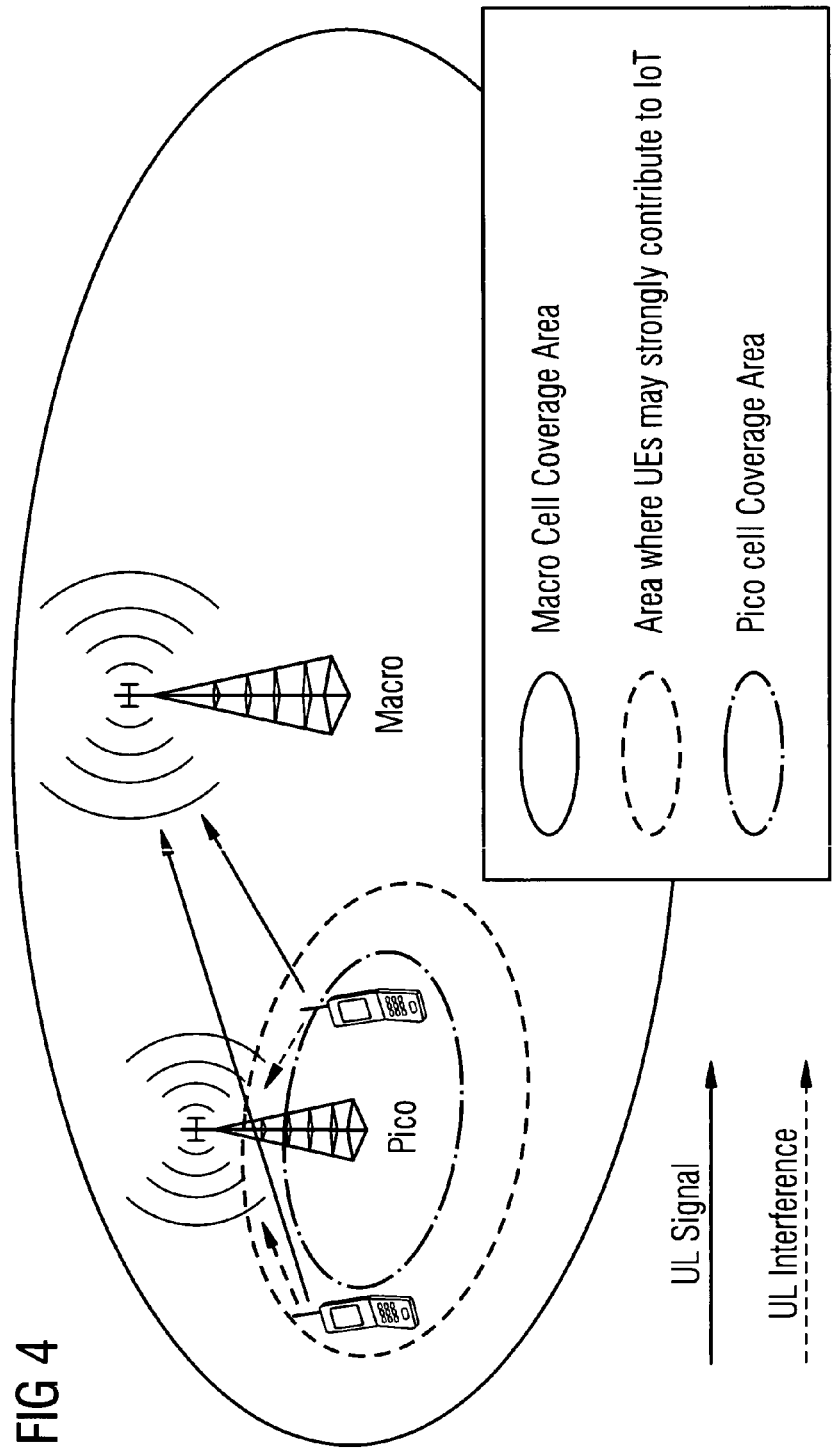
FIG. 4 shows a schematic diagram of a scenario for explaining a reliability problem in a heterogeneous network environment, for which exemplary embodiments of the present invention are applicable.

FIG. 4 shows a schematic diagram of a scenario for explaining a reliability problem in a heterogeneous network environment, for which exemplary embodiments of the present invention are applicable.

As shown in FIG. 4, a pico cell representing an example of a micro cell, the coverage area of which is illustrated by a dashed line, is deployed within a macro cell, the coverage area of which is illustrated by a solid line. Two UEs are located in the vicinity of the pico cell. As the pico cell is assumed to be inactive, i.e. in a listening/inactive mode, the uplink signal of both UEs, which is transmitted to the macro cell base station, causes uplink interference (i.e. increases IoT) at the pico cell base station. While the rightmost UE resides within an area where it may be served by the pico cell, the leftmost UE resides in an area where its uplink signal causes high interference (i.e. increases IoT) at the pico cell, but where it can not be served thereby. This is because the leftmost UE is not located within the coverage and/or outside the HO boundary, which is illustrated by a dash-dotted line. Accordingly, the received interference from UEs in the area between the dash-dotted line and the dashed line may lead to erroneous decisions, as the micro cell may be activated due to high IoT but eventually can not serve the UEs in this area.

A similar issue applies when UEs residing in the vicinity of a micro cell can not be served thereby due to incompatibility reasons, i.e. when the micro cell base station is operable in a radio access technology other than that of the UE or UEs in its vicinity. Namely, in such inter-RAT case (where, for example, the macro cell operates with a legacy (2G/3G) RAT and the micro cell operates with a LTE RAT), it might happen that a legacy (2G/3G) UE is near a micro cell, hence contributes to the IoT thereof, but is not LTE-capable and can thus not be served by the micro cell. Therefore a switch-on of the micro cell base station (based on the thus caused IoT measure) would not be helpful, as this UE can not be served by a switched-on LTE micro cell anyway. Accordingly, the received interference from non-compliant UEs in the area within the dashed line may lead to erroneous decisions, as the micro cell may be activated due to high IoT but eventually can not serve the non-compliant UEs in this area.

Various exemplary embodiments of the present invention are directed to address the IoT-based approach's disadvantages in terms of a potentially erroneous decision of activation (wake-up) of micro layer nodes due to uplink/downlink load asymmetry. This issue may also be considered as an uplink/downlink asymmetry problem.

Figure 5:
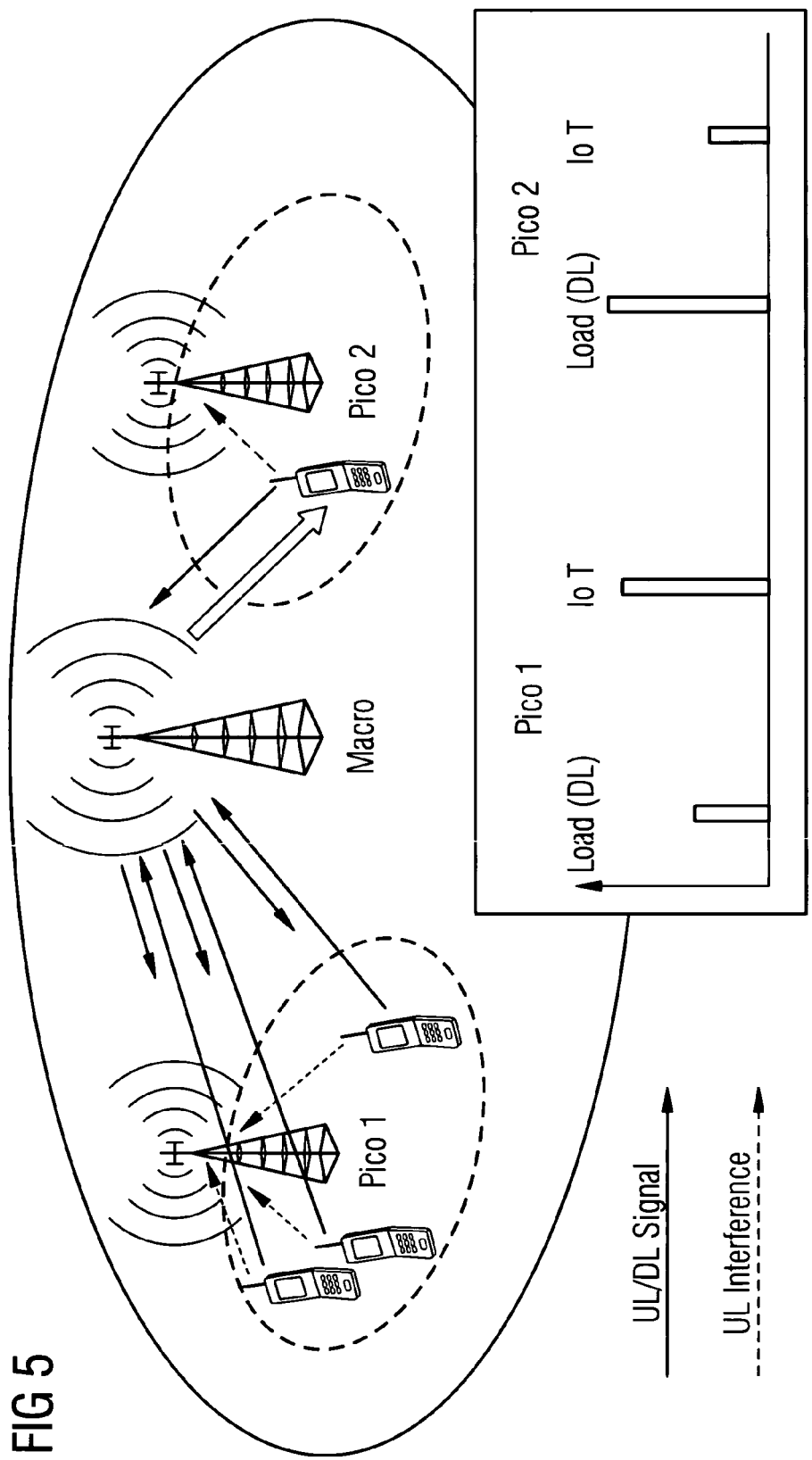
FIG. 5 shows a schematic diagram of a scenario for explaining an UL/DL asymmetry problem in a heterogeneous network environment, for which exemplary embodiments of the present invention are applicable.

FIG. 5 shows a schematic diagram of a scenario for explaining an UL/DL asymmetry problem in a heterogeneous network environment, for which exemplary embodiments of the present invention are applicable.

As shown in FIG. 5, two pico cells representing examples of micro cells, the coverage areas of which are illustrated by dashed lines, are deployed within a macro cell, the coverage area of which is illustrated by a solid line. Three UEs are located in the coverage area of the leftmost pico cell, and one UE is located in the coverage area of the rightmost pico cell. As the pico cells are assumed to be inactive, i.e. in a listening/inactive mode, the uplink signals of the UEs, which are transmitted to the macro cell base station, cause uplink interference (i.e. increases IoT) at the respective pico cell base station, while this is not the case for the downlink signals transmitted from the macro cell base station to the respective UEs. As derivable from the graphs, the IoT seen by the pico cell 1 is higher than that of pico cell 2. Therefore based on the IoT-based approach, the pico cell 1 would be activated. Yet, in case the high downlink load of the rightmost UE within the coverage area of the pico cell 2 is the main overload cause, the decision would not be the best.

Hence, an UL/DL traffic asymmetry might lead to the fact that IoT and DL load diverges, thus potentially resulting in that an asymmetry of the particular service (e.g. "heavy DL"—application) can lead to a situation that high DL users cause overload for the macro cell, while in UL, however, they may use a small data rate and hence contribute relatively little to the UL interference. Accordingly, there can occur an erroneous decision of activation (wake-up) of micro layer nodes due to uplink/downlink load asymmetry, and such situation might produce further inaccuracies.

In the following, exemplary embodiments of the present invention are described with reference to methods, procedures and functions, as well as with reference to structural arrangements and configurations.

According to exemplary embodiments of the present invention, there is provided an enhanced access node wake-up control on the basis of a combined pathloss measure. The enhanced access node wake-up control basically utilizes a combined consideration of an average handover pathloss level between an access node (to be woken up), such as a micro layer access node, and a neighboring access node, such as a macro layer access node, under the control of which the access node (to be woken up) resides, and an uplink sounding pathloss level between the access node (to be woken up), such as the micro layer access node, and a user equipment or terminal being connectable to both the access node and the neighboring access node. The uplink sounding pathloss level is estimated on the basis of an uplink sounding signal, such as an uplink sounding reference signal (UL SRS), which is transmitted from the user equipment or terminal to the access node (to be woken up), particularly a difference between transmit power and received power thereof. A decision on activation of the access node is made on the basis of a comparison of the average handover pathloss level and the uplink sounding pathloss level.

According to exemplary embodiments of the present invention, the enhanced access node wake-up control is based on a coordinated UE sounding mechanism and corresponding communications between the access node to be woken up and a neighboring access node.

Accordingly, exemplary embodiments of the present invention are capable of optimizing previous energy saving solutions based on eNB receiving UL signal power/strength.

In the following description, for the sake of clarity only, it is assumed that a micro layer access node is an access node to be woken up, and a macro layer access node is an active access node referred to as neighboring access node. Yet, the present invention is not limited thereto, but the access node to be woken up and the neighboring access node do not necessarily have to be located on the micro and macro layers of a heterogeneous network environment. Rather, it is sufficient that the access node to be woken up resides in the coverage area of, and might potentially be controlled by, the neighboring access node.

Figure 6:
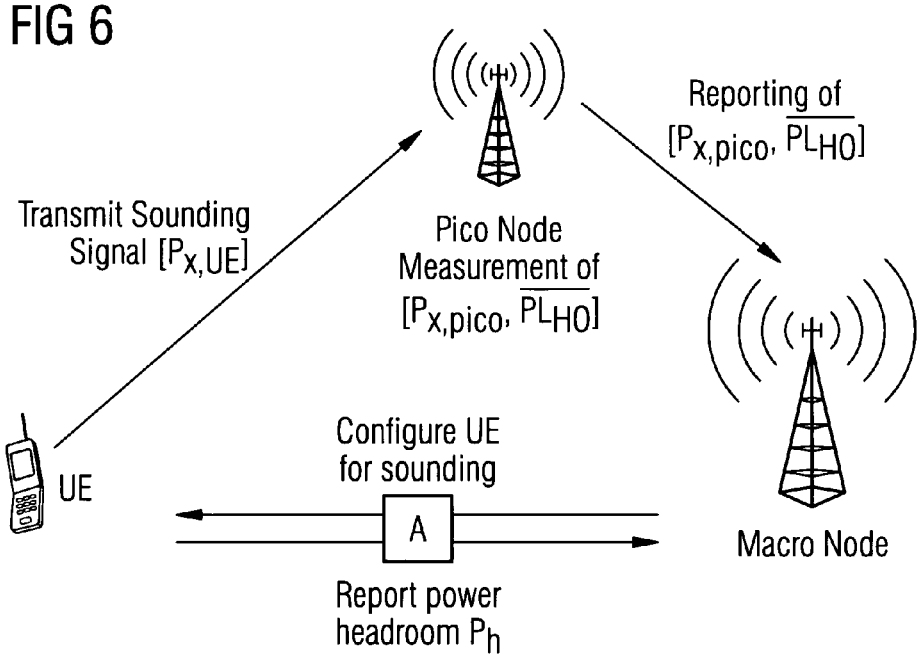
FIG. 6 shows a schematic diagram of a system overview of a procedure according to exemplary embodiments of the present invention.
Figure 7:
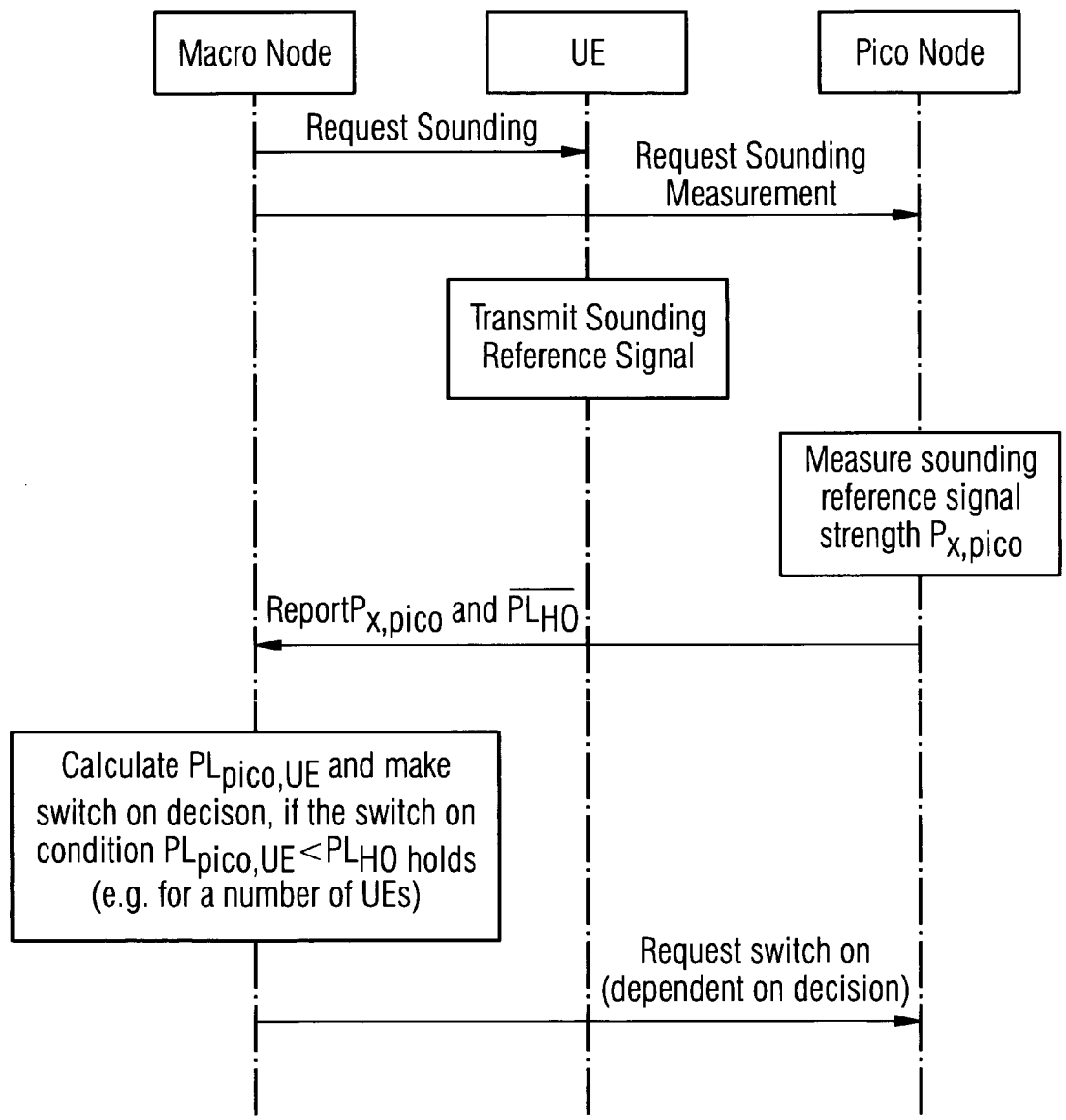
FIG. 7 shows a signaling diagram of a system overview of a procedure according to exemplary embodiments of the present invention.

FIG. 6 shows a schematic diagram of a system overview of a procedure according to exemplary embodiments of the present invention. FIG. 7 shows a signaling diagram of a system overview of a procedure according to exemplary embodiments of the present invention.

For simplicity (but without restricting the generality), an example for a single wide area cell with a single pico/micro cell and a single UE is given. Yet, an applicable deployment scenario may also comprise a plurality of pico/micro cells and a plurality of UEs residing in one or more of the plurality of pico/micro cells.

As shown in FIG. 6, a macro access node, a micro access node (which is here exemplarily assumed to be a pico access node, while micro and pico are construed to represent synonymous terms hereinafter) and a terminal may interact and cooperate to realize an enhanced access node wake-up control for waking up an access node (such as, for example, a micro cell in a heterogeneous network environment) according to exemplary embodiments of the present invention. The micro access node is assumed to be in an inactive (listening) mode. The depicted UE is assumed to be connected to the macro access node and configured to transmit (e.g. sounding reference) signals (e.g. for ES purposes) to the micro access node.

In FIG. 6, the arrows denoted with an A are showing UL data transmission, UL sounding as well as UL and DL signaling.

Referring to FIGS. 6 and 7, a procedure according to exemplary embodiments of the present invention may be as follows.

The macro access node may instruct and configure the terminal UE to transmit an uplink sounding signal, and instruct and configure the micro access node to measure the received signal power, RxP (SRS) (SRS: sounding reference signal as an example of an uplink sounding signal), thereof. Upon corresponding instructions/configurations, the terminal UE may transmit an uplink sounding signal to the micro access node, and the micro access node may measure the received power $P_{x,pico}$ ($=P_{x,micro}$) thereof and report the same to the macro access node. Further, the micro access node may already have computed an average handover pathloss level $\overline{PL_{HO}}$ during its switch-on/active time and now report the same to the macro access node. Thereby, the average handover pathloss level $\overline{PL_{HO}}$ and the received power $P_{x,pico}$ may be retrieved at the macro access node. Based on the received power $P_{x,pico}$ and a power headroom signal $P_h$ or the like being reported from the terminal UE, the macro access node may retrieve, i.e. compute, an uplink sounding pathloss level $PL_{pico,UE}$ ($=P_{micro,UE}$) and may enable (and make) a decision on whether or not to switch on, i.e. wake up, the micro access node.

In the inter-frequency case (i.e. when macro cell and pico/micro cell deploy different frequencies) the propagation characteristics are different, i.e. frequency dependent. A higher frequency typically experiences a higher pathloss. In order to compensate the difference in pathloss due to frequency differences, a delta (. . may be used:

$$PL_{pico,UE} = PL_{pico,UE,measured} + \ldots b \cdot 10 \log(f_{pico}/f_{macro})$$

b: configurable parameter, typically b=2.

In view thereof, according to exemplary embodiments of the present invention, an uplink sounding pathloss level may be estimated based on a difference between the transmit power and the received power. That is, in a case other than the aforementioned inter-frequency case the difference as such may be taken as the estimation result, while on the aforementioned inter-frequency case the corrective term delta (. may be considered as outlined above.

According to exemplary embodiments of the present invention, the average handover pathloss level $\overline{PL_{HO}}$ may be retrieved at the macro access node in a remote manner (as illustrated in FIGS. 6 and 7) as well as in a local or a combined manner.

In a local retrieval approach, the macro access node may compute an average handover pathloss level of handovers from the macro access node to the micro access node, and set the computed average handover pathloss level as the retrieved average handover pathloss level. The average handover pathloss level of handovers from the macro access node to the micro access node may be computed during a switch-on time of the micro access node, i.e. when the micro access node is active. In this time, statistical data related to the pathloss UEs typically have before they are handed over from macro cells to micro cells may be collected.

As an example the average pathloss at handover may be calculated as follows:

$$\overline{PL_{HO}} = \frac{1}{N} \sum_N PL_{HO}$$

where N is the number of available measurements and $PL_{HO}$ is the pathloss level of a handover in a respective measurement.

In a remote retrieval approach (as illustrated in FIGS. 6 and 7), the micro access node may compute an average handover pathloss level of handovers from the micro access node to the macro access node, and report the same to the macro access node. The average handover pathloss level of handovers from the micro access node to the macro access node may be computed during a switch-on time of the micro access node, i.e. when the micro access node is active. In this time, statistical data related to the pathloss UEs typically have before they are handed over from micro cells to macro cells may be collected. It may be computed in a similar way as outlined above, and it may be reported on request from the macro access node or periodically or the like. Then, the macro access node may set the received average handover pathloss level as the retrieved average handover pathloss level.

In a combined retrieval approach, the macro access node may combine the above-outlined local and remote approaches in that both an average handover pathloss level of handovers from the macro access node to the micro access node, as locally computable, and an average handover pathloss level of handovers from the micro access node to the macro access node, as remotely computable and reportable, are utilized. The average handover pathloss level may then be set on the basis of both levels, e.g. using the higher/lower one of the two levels, an average, or the like.

According to exemplary embodiments of the present invention, a reference pathloss level for comparison with the average handover pathloss level may be based on an uplink sounding signal being transmitted from the terminal to the micro access node. Accordingly, this reference level is denoted as the uplink sounding pathloss level.

For this purpose, one or more terminals may be configured, i.e. instructed, by the macro access node to transmit a suitable uplink sounding signal to the micro access node. Since the micro access node, during switch-off, is transferred into a power-efficient inactive listening mode where measurements of UL signals are enabled, it may be configured, i.e. instructed, by the macro access node to measure the received power of the uplink sounding signal received from the one or more terminals. In the respective configurations, i.e. instructions, a specific (coordinated) timing as well as specific SRS configurations (such as e.g. Zadoff-Chu sequences) may be defined. Also, the macro access node may specifically select one or more terminals under its control for transmitting the suitable uplink sounding signal.

According to exemplary embodiments of the present invention, a suitable uplink sounding signal may be any specified sounding reference signal, such as the LTE sounding reference signal based on Zadoff-Chu sequences, for example.

According to exemplary embodiments of the present invention, the uplink sounding pathloss level may be estimated based on a difference between a received power of the uplink sounding signal at the access node and a transmit power of the uplink sounding signal at the terminal. Accordingly, the uplink sounding pathloss level may be based on the transmission of the uplink sounding signal from the terminal to the micro access node, which transmission may be instructed by the macro access node.

In this regard, the macro access node may receive, from the micro access node, a report of a received power $P_{x,micro}$ of the uplink sounding signal at the micro access node, and may receive, from the terminal, an indication of transmit power of the uplink sounding signal transmitted to the access node. This indication may comprise the transmit power $P_{x,UE}$ as such or a transmit power headroom $P_h$ based on which the macro access node may calculate the actual transmit power on the basis of its knowledge of the terminal's maximum transmit power $P_{max,UE}$ as follows:

$$P_{x,UE} = P_{max,UE} - P_h.$$

The usage of the transmit power headroom $P_h$ is beneficial, since the terminal in connected mode typically signals this measure in the uplink e.g. periodically. The transmit power headroom $P_h$ is defined as the difference between the currently used transmit power and the maximum available power of the terminal.

With the thus received/calculated information, including the reported received power $P_{x,micro}$ and the calculated transmit power $P_{x,UE}$, the macro access node may estimate the pathloss (PL) between the UE and the micro cell, i.e. the uplink sounding pathloss level, as follows:

$$PL_{micro,UE} = P_{x,UE} - P_{x,micro}.$$

According to exemplary embodiments of the present invention, the switch-on request may be issued when the following condition holds (for at least one or a predefined number of UEs):

$$PL_{micro,UE} < \overline{PL_{HO}}.$$

Accordingly, the macro access node may decide to activate the micro access node, while ensuring that the UE or UEs can be served from DL (and UL) perspective by the thus activated micro access node.

Namely, when the above condition is satisfied, a switch-on of the micro access node is enabled or allowed. Based on such enabled or allowed switch-on, the macro access node may make a decision on the switch-on of the micro access node and, if decided accordingly, request the switch-on of the micro access node. That is to say, satisfaction of the above condition does not necessarily result in the switch-on of the micro access node, but it is used as an indication that the UE potentially could be served by that micro access node. In the actual switch-on decision by the macro access node, which is enabled or allowed by satisfaction of the above condition, further inputs (such as UE load) may be additionally considered.

Accordingly, the above condition is a necessary but not a sufficient condition for the switch-on decision of the micro access node.

According to exemplary embodiments of the present invention, the macro access node may be controlled accordingly e.g. by an OAM (Operation Administration and Maintenance) entity.

Generally, the above-outlined procedure is equally applicable in the inter-eNB and inter-RAT scenarios explained above.

In case different frequency bands are considered (i.e. in an inter-frequency case) and/or in case macro and micro cells use different technologies (i.e. in an inter-RAT case), some further measures may be additionally implemented. For example, the micro access node may decode the uplink sounding signal in the frequency (band) of the macro access node, thus ensuring that the received power indicates a power in the frequency (band) of the macro access node. Such measure could be particularly effective in an intra-LTE inter-frequency case.

In case the terminal temporarily sends the uplink sounding signal using the frequency of the micro access node, an active connection with the macro access node may be interrupted and it may be tuned into the frequency of the micro access node. Accordingly, the uplink sounding signal may be transmitted intermittently or, stated in other words, "sounding gaps" may be configured for the terminal. Such measure could be particularly effective in 2G/3G/LTE-inter-frequency cases.

According to exemplary embodiments of the present invention, as described above, a very high accuracy of underlying measurements and, thus, a high reliability of wake-up decisions may be achieved. Further, an UE-specific decision may be made, and for further (configurable) inputs are usable during the decision process. It is particularly utilized that the macro access node acquires full knowledge, if a specific UE is located inside or outside a micro cell. Furthermore, it is utilized that the macro access node has available all information (load, services, capabilities etc.) of all relevant UEs, as it is the serving access node during the relevant periods when the micro cell/cells is/are switched off. Accordingly, it may be achieved that dormant access nodes do not need to wake up without an actual need thereof, this achieving an improved energy/power saving. At least in the case of an intra-frequency deployment, no additional hardware is required.

In view of the above, basic functionalities of individual involved entities may be as described hereinafter.

Figure 8:
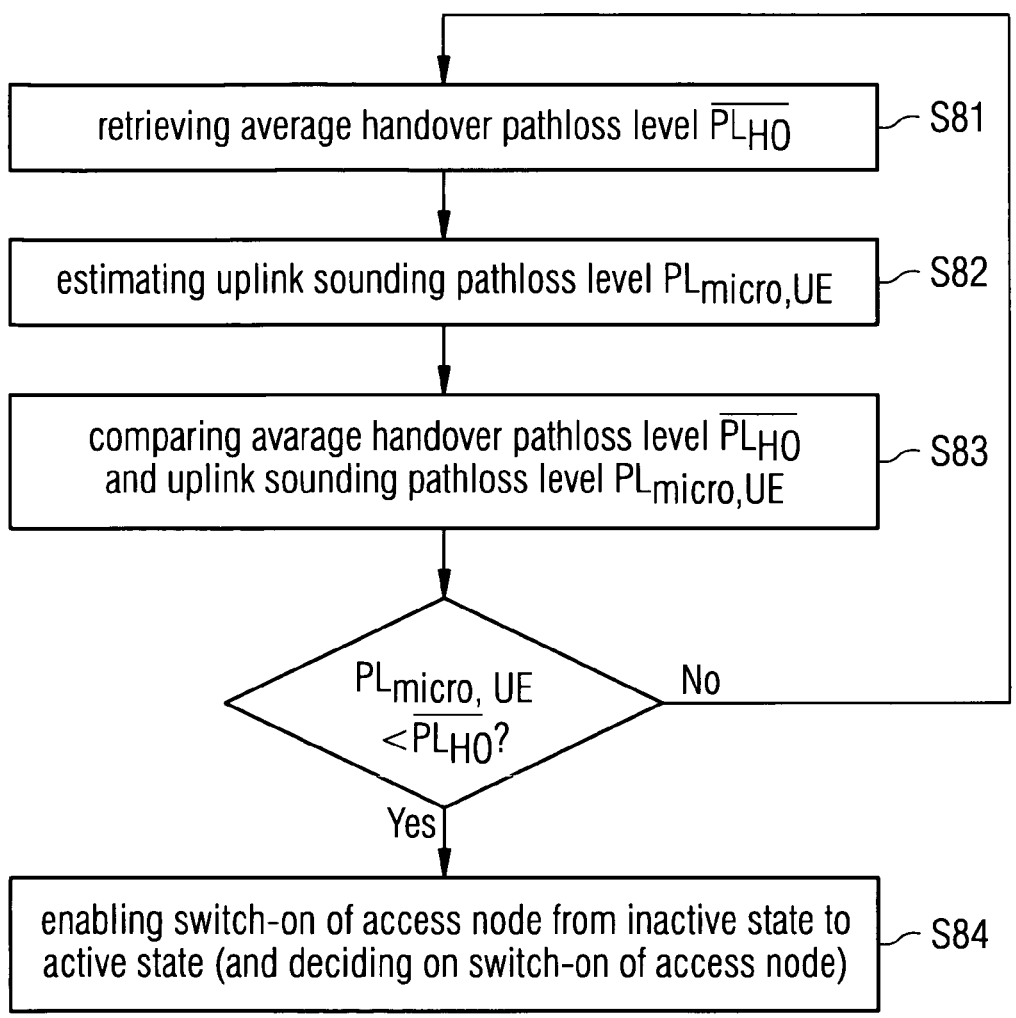
FIG. 8 shows a flowchart illustrating an example of a procedure which is operable at or by a macro access node according to exemplary embodiments of the present invention.

FIG. 8 shows a flowchart illustrating an example of a procedure which is operable at or by a macro access node according to exemplary embodiments of the present invention.

The exemplary method according to FIG. 8 may be regarded as (a part of) an enhanced access node wake-up control for waking up an access node (such as, for example, a micro cell in a heterogeneous network environment). The exemplary method according to FIG. 8 may, for example, be performed by or at a base station or access node of a macro cell layer, in the coverage area of which an access node or base station to be woken up is located.

As shown in FIG. 8, a method according to exemplary embodiments of the present invention may comprise an operation of retrieving (S81) an average handover pathloss level between an access node (to be woken up), e.g. a micro layer access node or base station, and a neighboring access node, e.g. a macro layer access node or base station, an operation of estimating (S82) an uplink sounding pathloss level between the access node and a terminal, wherein the terminal is connectable to the access node and the neighboring access node and is currently served by the neighboring access node, an operation of comparing (S83) the estimated uplink sounding pathloss level and the retrieved average handover pathloss level, and an operation of enabling (S84) a switch-on of the access node from an inactive state in which a transmitter is switched off to an active state in which the transmitter is switched on, when the estimated uplink sounding pathloss level is smaller than the retrieved average handover.

Accordingly, when being enabled, a corresponding switch-on decision may be made (possible considering further inputs), and a switch-on request may be issued towards the micro access node in case of a respective decision being made.

Figure 9:
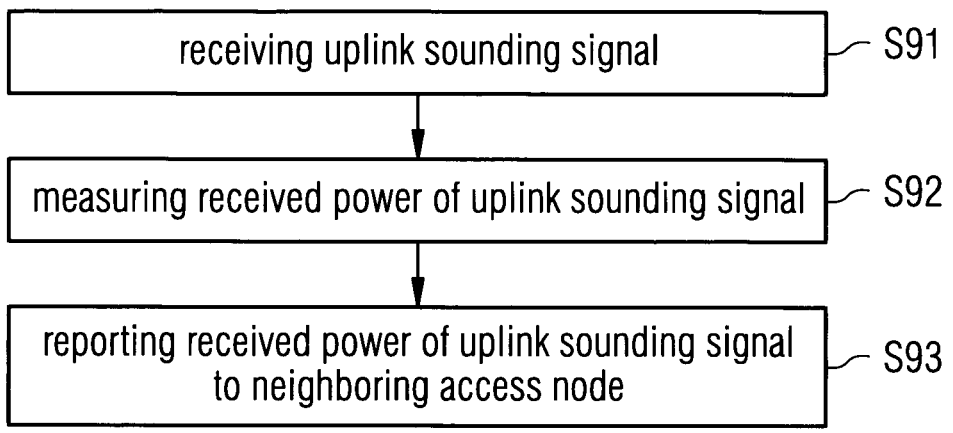
FIG. 9 shows a flowchart illustrating an example of a procedure which is operable at or by a micro access node according to exemplary embodiments of the present invention.

FIG. 9 shows a flowchart illustrating an example of a procedure which is operable at or by a micro access node according to exemplary embodiments of the present invention.

The exemplary method according to FIG. 9 may be regarded as (a part of) an enhanced access node wake-up control for waking up an access node (such as, for example, a micro cell in a heterogeneous network environment). The exemplary method according to FIG. 9 may, for example, be performed by or at a base station or access node of a micro cell layer, which is located in the coverage area of a base station or access node of a macro cell layer.

As shown in FIG. 9, a method according to exemplary embodiments of the present invention may comprise an operation of receiving (S91) an uplink sounding signal from a terminal, wherein the terminal is connectable to an access node (to be woken up), e.g. a micro layer access node or base station, and a neighboring access node, e.g. a macro layer access node or base station, and is currently served by the neighboring access node, an operation of measuring (S92) a received power of the uplink sounding signal received from the terminal at the access node, and an operation of reporting (S93) the measured received power from the access node to the neighboring access node. According to exemplary embodiments of the present invention, the receiving, measuring and reporting operations are performed when the access node is in an inactive state in which a transmitter is switched off.

Figure 10:
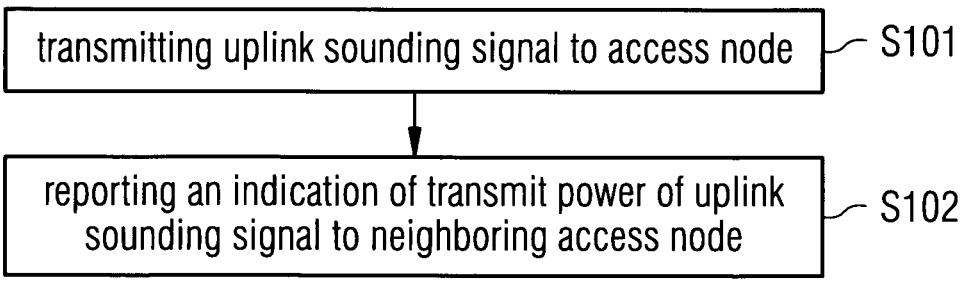
FIG. 10 shows a flowchart illustrating an example of a procedure which is operable at or by a user equipment according to exemplary embodiments of the present invention.

FIG. 10 shows a flowchart illustrating an example of a procedure which is operable at or by a user equipment according to exemplary embodiments of the present invention.

The exemplary method according to FIG. 10 may be regarded as (a part of) an enhanced access node wake-up control for waking up an access node (such as, for example, a micro cell in a heterogeneous network environment). The exemplary method according to FIG. 10 may, for example, be performed by or at a terminal which is connected to an access node or base station of a macro cell layer but which is also connectable to an access node or base station of a micro cell layer.

As shown in FIG. 10, a method according to exemplary embodiments of the present invention may comprise an operation of transmitting (S101) an uplink sounding signal to an access node (to be woken up), e.g. a micro layer access node or base station, and an operation of reporting (S102), to a neighboring access node, e.g. a macro layer access node or base station, an indication of transmit power of the uplink sounding signal transmitted to the access node.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 11, while for the sake of brevity reference is made to the detailed description of respective corresponding methods and operations according to FIGS. 6 and 10 as well as the underlying system architectures and deployment scenarios according to FIGS. 1 to 5.

Figure 11:
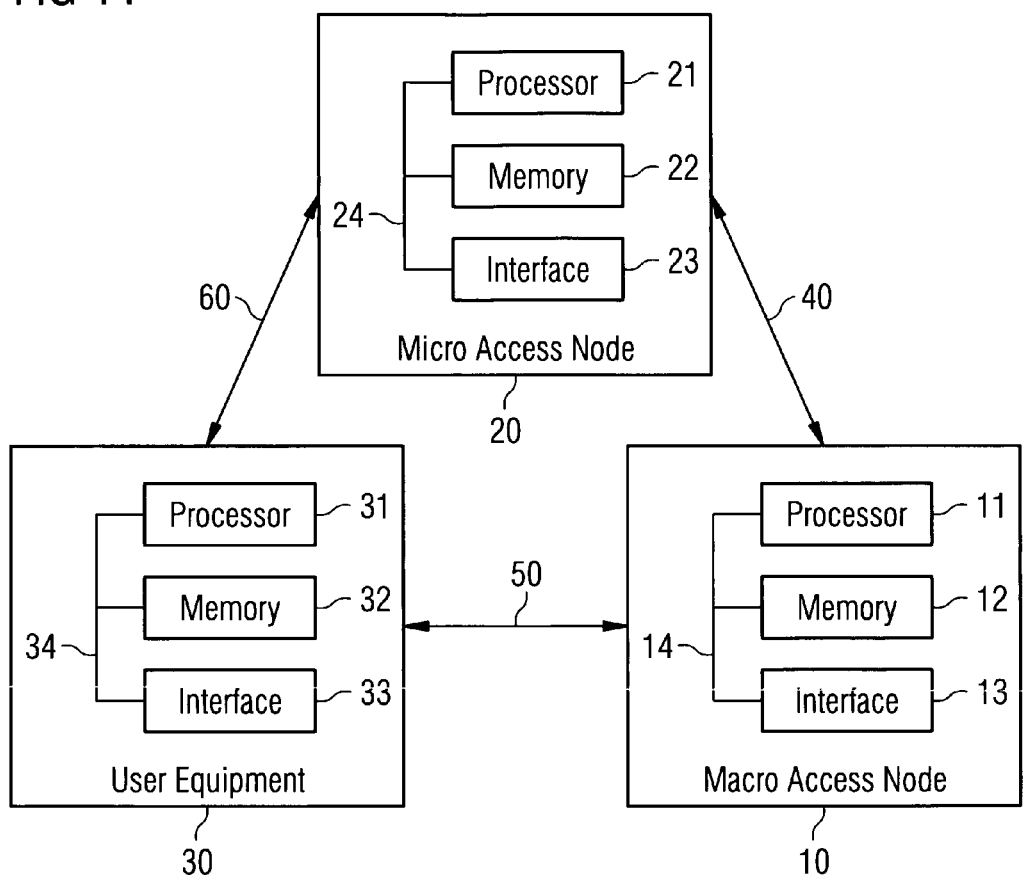
FIG. 11 shows a block diagram illustrating exemplary devices according to exemplary embodiments of the present invention.

In FIG. 11 below, the solid line blocks are basically configured to perform respective operations as described above. The entirety of solid line blocks are basically configured to perform the methods and operations as described above, respectively. With respect to FIG. 11, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 11, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 11 shows a block diagram illustrating exemplary devices according to exemplary embodiments of the present invention.

In view of the above, the thus described apparatuses 10, 20 and 30 are suitable for use in practicing the exemplary embodiments of the present invention, as described herein. The thus described apparatus 20 may represent a (part of a) access node (such as e.g. a micro cell node) to be woken up, as described above, and may be configured to perform a procedure and/or exhibit a functionality as described in conjunction with any one of FIGS. 6, 7 and 9. The thus described apparatus 10 may represent a (part of a) neighboring access node (such as e.g. a macro cell node), as described above, and may be configured to perform a procedure and/or exhibit a functionality as described in conjunction with any one of FIGS. 6 to 8. The thus described apparatus 30 may represent a (part of a) user equipment, as described above, and may be configured to perform a procedure and/or exhibit a functionality as described in conjunction with any one of FIGS. 6, 7 and 10.

As shown in FIG. 11, according to embodiments of the present invention a micro access node apparatus 20 comprises a processor 21, a memory 22, and an interface 23, which are connected by a bus 24 or the like, a macro access node apparatus 10 comprises a processor 11, a memory 12, and an interface 13, which are connected by a bus 14 or the like, and user equipment apparatus 30 comprises a processor 31, a memory 32, and an interface 33, which are connected by a bus 34 or the like. The micro access node apparatus 20 may be connected with the macro access node apparatus 20 through a link or connection 40, the micro access node apparatus 20 may be connected with the user equipment apparatus 30 through a link or connection 60, and the macro access node apparatus 20 may be connected with the user equipment apparatus 30 through a link or connection 50.

The memories 12, 22 and 32 may store respective programs assumed to include program instructions that, when executed by the associated processors 11, 21 and 31, enable the electronic device to operate in accordance with the exemplary embodiments of the present invention. The processors 11, 21 and 31 may also include a modem to facilitate communication over the (hardwire or wireless) links 40, 50 and 60 via the interfaces 13, 23 and 33, respectively. The interfaces 13, 23 and 33 may further include a suitable transceiver coupled to one or more antennas or communication means for (hardwire or wireless) communications with the linked or connected device(s), respectively. The interfaces 13, 23 and 33 are configured to communicate with another apparatus, i.e. the interface thereof, respectively.

In general terms, the respective devices (and/or parts thereof) may represent means for performing respective operations and/or exhibiting respective functionalities, and/or the respective devices (and/or parts thereof) may have functions for performing respective operations and/or exhibiting respective functionalities.

According to exemplary embodiments of the present invention, the processor 11 is configured to retrieve an average handover pathloss level between an access node 20 and a neighboring access node 10, to estimate an uplink sounding pathloss level between the access node 20 and a terminal 30, to compare the estimated uplink sounding pathloss level and the retrieved average handover pathloss level, and to enable a switch-on of the access node 20 from an inactive state in which a transmitter is switched off to an active state in which the transmitter is switched on, when the estimated uplink sounding pathloss level is smaller than the retrieved average handover.

According to exemplary embodiments of the present invention, the processor 11 may be further configured to decide on a switch-on of the access node, when the switch-on is enabled, and request, via the interface, a switch-on of the access node, when the switch-on is decided.

According to exemplary embodiments of the present invention, the processor 11 may be further configured to receive, from the access node 20 via the interface 13, a report of a received power of an uplink sounding signal received from the terminal, to receive, from the terminal 30 via the interface 13, an indication of transmit power of the uplink sounding signal transmitted to the access node, and to estimate an uplink sounding pathloss level based on a difference between the transmit power and the received power.

According to exemplary embodiments of the present invention, the processor 11 may be further configured to configure, via the interface 13, the terminal 30 for transmitting the uplink sounding signal (including e.g. a predefined timing and/or signal configuration), and to configure, via the interface 13, the access node 20 for performing sounding measurement of the uplink sounding signal (e.g. at the predefined timing and/or on the configured signal).

According to exemplary embodiments of the present invention, the processor 11 may be further configured to receive, from the access node 20 via the interface 13, a report of an average handover pathloss level of handovers from the access node to the neighboring access node, and/or to compute an average handover pathloss level of handovers from the neighboring access node to the access node, and then set as the retrieved average handover pathloss level one of the received average handover pathloss level, the computed average handover pathloss level, and a computed value based thereon.

According to exemplary embodiments of the present invention, the processor 21 is configured to receive, via the interface 23, an uplink sounding signal from a terminal 30, to measure a received power of the uplink sounding signal received from the terminal 30, and to report the measured received power to the neighboring access node 10, wherein the processor is configured to perform the receiving, measuring and reporting when the access node is in an inactive state in which a transmitter is switched off.

According to exemplary embodiments of the present invention, the processor 21 may be further configured to receive, from the neighboring access node 10 via the interface 23, a request for a switch-on of the access node from the inactive state to an active state in which the transmitter is switched on, and to switch from the inactive state to the active state based on the received request.

According to exemplary embodiments of the present invention, the processor 21 may be further configured to receive, from the neighboring access node 10 via the interface 23, a configuration for performing sounding measurement of the uplink sounding signal (e.g. at a predefined timing and/or on a configured signal), and/or to compute an average handover pathloss level of handovers from the access node to the neighboring access node, and report, via the interface 13, the computed average handover pathloss level to the neighboring access node 10, wherein the computing is performed when the access node 20 is in an active state in which the transmitter is switched on.

According to exemplary embodiments of the present invention, the processor 31 is configured to transmit, via the interface 33, an uplink sounding signal to an access node 20, and to report, to a neighboring access node 10 via the interface 33, an indication of transmit power of the uplink sounding signal transmitted to the access node 20.

According to exemplary embodiments of the present invention, the processor 31 may be further configured to receive, from the neighboring access node 10 via the interface 33, a configuration for transmitting the uplink sounding signal (including e.g. a predefined timing and/or signal configuration).

In general, exemplary embodiments of the present invention may be implemented by computer software stored in the memories 12, 22 and 23 and executable by the processors 11, 21 and 31, or by hardware, or by a combination of software and/or firmware and hardware in any or all of the devices shown.

According to exemplarily embodiments of the present invention, a system may comprise any conceivable combination of the thus depicted apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (ComplementaryMOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. An apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor. A device may be regarded as an apparatus or as an assembly of more than one apparatus, whether functionally in cooperation with each other or functionally independently of each other but in a same device housing, for example.

Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means (portions) or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for a pathloss-based access node wake-up control, more specifically a pathloss-based access node wake-up control in a heterogeneous network environment. Such measures exemplarily comprise a retrieval of an average handover pathloss level between an access node and a neighboring access node, an estimation of an uplink sounding pathloss level between the access node and a terminal, said terminal being connectable to the access node and the neighboring access node, a comparison of the estimated uplink sounding pathloss level and the retrieved average handover pathloss level, and an enabling of a switch-on of the access node from an inactive state in which a transmitter is switched off to an active state in which the transmitter is switched on, when the estimated uplink sounding pathloss level is smaller than the retrieved average handover.

The measures proposed according to exemplary embodiments of the present invention may be applied for any kind of network environment, particularly in any kind of heterogeneous network environment, such as for example for those in accordance with 3GPP RAN2/RAN3 standards and/or 3GPP LTE standards of release 10/11/12/ . . . (LTE-Advanced and its evolutions).

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:

1. A method comprising
retrieving an average handover pathloss level between an access node and a neighboring access node,
estimating an uplink sounding pathloss level between the access node and a terminal, said terminal being connectable to the access node and the neighboring access node,
comparing the estimated uplink sounding pathloss level and the retrieved average handover pathloss level, and
enabling a switch-on of the access node from an inactive state in which a transmitter is switched off to an active state in which the transmitter is switched on, when the estimated uplink sounding pathloss level is smaller than the retrieved average handover.

2. The method according to claim 1, further comprising
deciding on a switch-on of the access node, when the switch-on is enabled, and
requesting a switch-on of the access node, when the switch-on is decided.

3. The method according to claim 1, wherein the estimating comprises
receiving, from the access node, a report of a received power of an uplink sounding signal received from the terminal, receiving, from the terminal, an indication of transmit power of the uplink sounding signal transmitted to the access node, and
estimating an uplink sounding pathloss level based on a difference between the transmit power and the received power.

4. The method according to claim 3, further comprising
configuring the terminal for transmitting the uplink sounding signal, and
configuring the access node for performing sounding measurement of the uplink sounding signal.

5. The method according to claim 3, wherein the uplink sounding signal comprises an uplink sounding reference signal, and/or
the received power indicates a power in a frequency band of the neighboring access node, and/or
the indication of transmit power comprises a transmit power report or a transmit power headroom report.

6. The method according to claim 1, wherein the retrieving comprises one of:
receiving, from the access node, a report of an average handover pathloss level of handovers from the access node to the neighboring access node, and setting the received average handover pathloss level as the retrieved average handover pathloss level,
computing, at the neighboring access node, an average handover pathloss level of handovers from the neighboring access node to the access node, and setting the computed average handover pathloss level as the retrieved average handover pathloss level, and
receiving, from the access node, a report of an average handover pathloss level of handovers from the access node to the neighboring access node, computing, at the neighboring access node, an average handover pathloss level of handovers from the neighboring access node to the access node, and setting a value on the basis of the received average handover pathloss level and the computed average handover pathloss level as the retrieved average handover pathloss level.

7. A computer program product including a non-transitory computer-readable storage medium comprising software code portions being arranged, when run on a processor of an apparatus, to cause the apparatus to perform the method according to claim 1.

8. A method comprising
receiving an uplink sounding signal from a terminal at an access node, said terminal being connectable to the access node and a neighboring access node,
measuring a received power of the uplink sounding signal received from the terminal at the access node,
computing, at the access node, an average handover pathloss level between the access node and the neighboring access node, and reporting the measured received power and the average handover pathloss level from the access node to the neighboring access node,
wherein the receiving, measuring and reporting is performed when the access node is in an inactive state in which a transmitter for serving terminals in a coverage area of the access node is switched off.

9. The method according to claim 8, further comprising
receiving, from the neighboring access node, a request for a switch-on of the access node from the inactive state to an active state in which the transmitter is switched on, and switching from the inactive state to the active state based on the received request.

10. The method according to claim 8, wherein the computing the average handover pathloss level is performed when the access node is in an active state in which the transmitter is switched on.

11. The method according to claim 8, wherein the uplink sounding signal comprises an uplink sounding reference signal, and/or
the received power indicates a power in a frequency band of the neighboring access node.

12. An apparatus comprising
at least one memory comprising code; and
at least one processor,
the at least one memory and code configured, with the at least one processor, to cause the apparatus to perform at least the following:
retrieve an average handover pathloss level between an access node and a neighboring access node,
estimate an uplink sounding pathloss level between the access node and a terminal, said terminal being connectable to the access node and the neighboring access node, compare the estimated uplink sounding pathloss level and the retrieved average handover pathloss level, and
enable a switch-on of the access node from an inactive state in which a transmitter is switched off to an active state in which the transmitter is switched on, when the estimated uplink sounding pathloss level is smaller than the retrieved average handover.

13. The apparatus according to claim 12, wherein the at least one memory and code are further configured, with the at least one processor, to cause the apparatus to:
decide on a switch-on of the access node, when the switch-on is enabled, and request, via the interface, a switch-on of the access node, when the switch-on is decided.

14. The apparatus according to claim 13, wherein the at least one memory and code are further configured, with the at least one processor, to cause the apparatus to:
configure, via the interface, the terminal for transmitting the uplink sounding signal, and
configure, via the interface, the access node for performing sounding measurement of the uplink sounding signal.

15. The apparatus according to claim 12, wherein the estimating further comprises:
receive, from the access node via the interface, a report of a received power of an uplink sounding signal received from the terminal,
receive, from the terminal via the interface, an indication of transmit power of the uplink sounding signal transmitted to the access node, and
estimate an uplink sounding pathloss level based on a difference between the transmit power and the received power.

16. The apparatus according to claim 15, wherein
the uplink sounding signal comprises an uplink sounding reference signal, and/or
the received power indicates a power in a frequency band of the neighboring access node, and/or
the indication of transmit power comprises a transmit power report or a transmit power headroom report.

17. The apparatus according to claim 12, wherein the retrieving further comprises:
receive, from the access node via the interface, a report of an average handover pathloss level of handovers from the access node to the neighboring access node, and set the received average handover pathloss level as the retrieved average handover pathloss level,
compute, at the neighboring access node, an average handover pathloss level of handovers from the neighboring access node to the access node, and set the computed average handover pathloss level as the retrieved average handover pathloss level, and receive, from the access node via the interface, a report of an average handover pathloss level of handovers from the access node to the neighboring access node, compute, at the neighboring access node, an average handover pathloss level of handovers from the neighboring access node to the access node, and set a value on the basis of the received average handover pathloss level and the computed average handover pathloss level as the retrieved average handover pathloss level.

18. A computer program product including a non-transitory computer-readable storage medium comprising software code portions being arranged, when run on a processor of an apparatus, to cause the apparatus to perform the method according to claim 12.

19. An apparatus comprising
at least one memory comprising code; and
at least one processor,
the at least one memory and code configured, with the at least one processor, to cause the apparatus to perform at least the following:
receive, via the interface, an uplink sounding signal from a terminal at an access node, said terminal being connectable to the access node and a neighboring access node,
measure a received power of the uplink sounding signal received from the terminal at the access node,
computing, at the access node, an average handover pathloss level between the access node and the neighboring access node, and
report the measured received power and the average handover pathloss level from the access node to the neighboring access node,
wherein the processor is configured to perform the receiving, measuring and reporting when the access node is in an inactive state in which a transmitter for serving terminals in a coverage area of the access node is switched off.

20. The named-apparatus according to claim 19, wherein the at least one memory and code are further configured, with the at least one processor to cause the apparatus to:
receive, from the neighboring access node via the interface, a request for a switch-on of the access node from the inactive state to an active state in which the transmitter is switched on, and
switch from the inactive state to the active state based on the received request.

21. The apparatus according to claim 19, wherein the computing the average handover pathloss level is performed when the access node is in an active state in which the transmitter is switched on.

22. The apparatus according to claim 19, wherein the uplink sounding signal comprises an uplink sounding reference signal, and/or the received power indicates a power in a frequency band of the neighboring access node.

* * * * *

UNITED STATES PATENT AND TRADEMARK OFFICE
CERTIFICATE OF CORRECTION

PATENT NO. : 8,965,375 B2  
APPLICATION NO. : 14/115404  
DATED : February 24, 2015  
INVENTOR(S) : Michel et al.

Page 1 of 1

It is certified that error appears in the above-identified patent and that said Letters Patent is hereby corrected as shown below:

In the Claims,

Claim 20, col. 24, line 53 "named-" should be deleted in between "The" and "apparatus".

Signed and Sealed this
Twelfth Day of May, 2015

Michelle K. Lee
*Director of the United States Patent and Trademark Office*